March 20, 1928. 1,662,847
F. J. COOK
ELECTRICAL COOKING APPARATUS
Filed Sept. 11, 1925   2 Sheets-Sheet 1
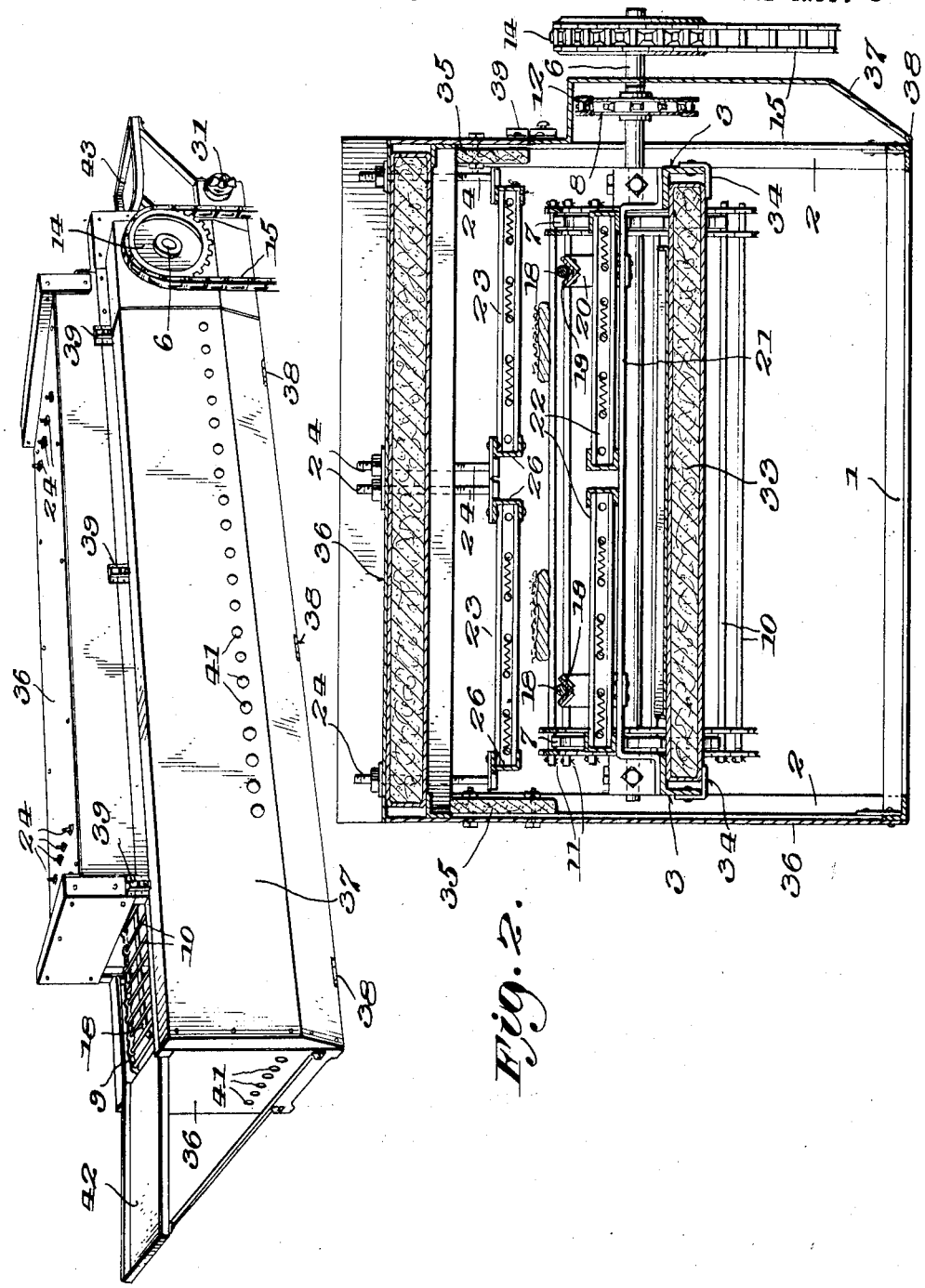
Inventor
Frank J. Cook
By Prentiss, Stone & Boyden
Attorney March 20, 1928. 1,662,847
F. J. COOK
ELECTRICAL COOKING APPARATUS
Filed Sept. 11, 1925 2 Sheets-Sheet 2
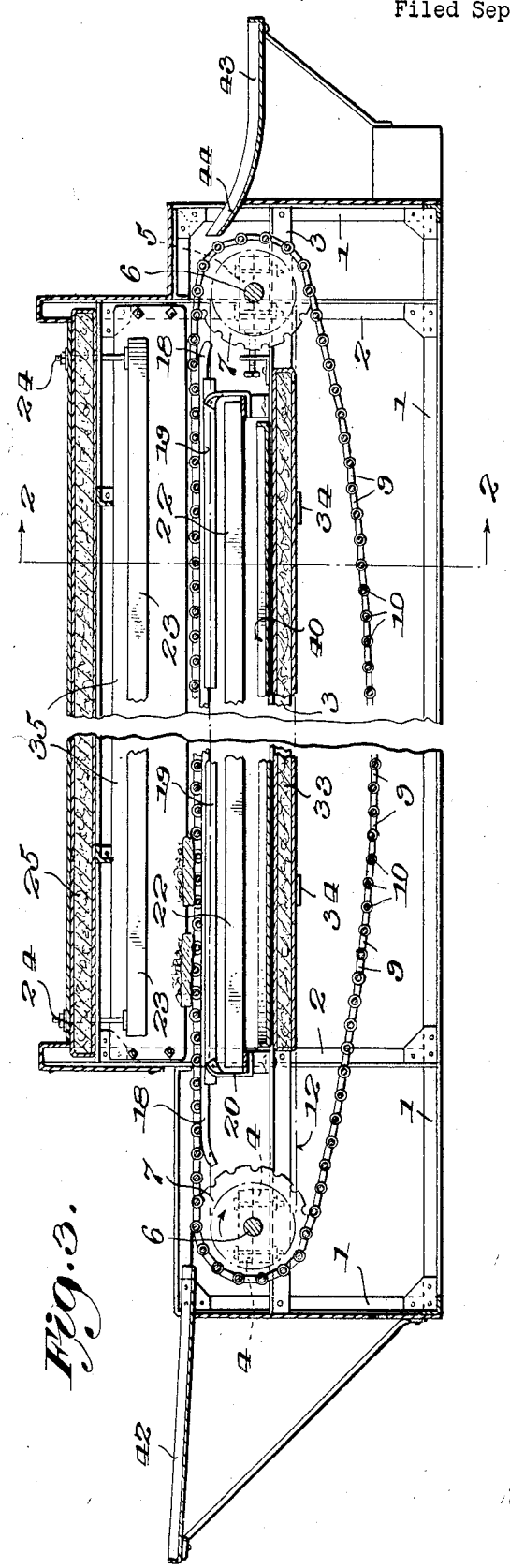
Inventor
Frank J. Cook
By Prentiss, Ame & Boyden
Attorney Patented Mar. 20, 1928.

1,662,847

UNITED STATES PATENT OFFICE.

FRANK J. COOK, OF CLEVELAND, OHIO.

ELECTRICAL COOKING APPARATUS.

Application filed September 11, 1925. Serial No. 55,759.

This invention relates to electrical cooking apparatus and has particular reference to a machine for toasting, broiling, or frying bread, sandwiches or other food products.

The primary object of the present invention is to provide an apparatus for automatically conveying the food products through an electrically heated oven so as to subject the same to a predetermined degree of heat for a predetermined length of time, and thus insure results which shall be independent of the skill of the operator.

Another object is to provide an apparatus of this general character which shall be neat and attractive in appearance and which shall be particularly adapted for use in restaurants and similar places.

A further object is to provide an apparatus of the aforesaid character which shall be simple in construction, inexpensive to manufacture and which shall be highly efficient and durable in operation and readily accessible for purposes of cleaning, adjustment, or repair.

With these and other objects in view, the invention may be stated to consist in the various novel features of construction and arrangement or combination, all of which will be fully described hereinafter and pointed out in appended claims.

In the drawings accompanying and forming part of this application,

Fig. 1 is a perspective view of a machine constructed in accordance with my invention;

Fig. 2 is a transverse vertical sectional view taken on the line 2—2 of Fig. 3;

Fig. 3 is a longitudinal view through the machine;

Fig. 4 is a detail fragmentary perspective view of one of the heating elements; and Fig. 5 is an enlarged fragmentary longitudinal sectional view through one of the heating elements.

Describing the various parts by reference characters, 1 denotes a substantially oblong frame work which may be conveniently formed from angle iron. Adjacent each end of this frame there is fastened a pair of uprights 2 which project above the main frame, and serve to support the upper heating elements, and a heat insulating wall to be referred to hereinafter. A pair of longitudinal supports 3 also formed from angle iron and arranged, one on each side of the main frame 1, are positioned intermediate the top and bottom thereof, and these supports have fastened thereto a pair of rigidly mounted bearing blocks 4 and a pair of adjustably mounted bearing blocks 5.

A shaft 6 is journaled in each pair of bearing blocks and each shaft has mounted thereon, a pair of conveyor sprocket wheels 7 and a drive sprocket wheel 8. The conveyor sprocket wheels receive a conveyor belt composed of side links 9 which are pivotally connected together by cross rods 10, the outer ends whereof are fitted with cotter pins 11 or other suitable fastening means. The drive sprocket wheels 8 receive a drive chain 12 that relieves the conveyor belt of all strains incident to movement thereof. As shown in Figs. 1 and 2, one of the shafts 6 preferably projects beyond the framework and casing and receives on the outer end thereof a drive sprocket 14 which may be connected by a chain 15 with any suitable source of power.

In order to prevent sagging of the upper flight of the conveyor, I provide longitudinal supporting bars 18 thereunder. These bars are conveniently supported by channels 19 which are fastened to brackets 20 that project upwardly from cross bars 21, the latter being fastened to the side channels 3. The cross bars 21 also serve as supports for a pair of lower electrical heating elements 22 which are disposed beneath the upper flight of the conveyor. Heat is also applied to the top side of the conveyor by heating elements 23 which are preferably supported by bolts 24 that depend from a top heat insulating plate 25. Each of the upper and lower heating elements is identical in construction and, as shown in Figs. 4 and 5, comprises oppositely arranged channels 26 which receive transverse channel supports 27, and these latter channels embrace a fire resistant bar 28. The bars 28 are formed with suitable apertures 29 through which is inserted an electrical resistance element 30. A switch 31 (Fig. 1) mounted at any convenient place on the machine controls the degree of heat emitted from either one or both of the heating elements 22 and 23.

An oven is defined by the aforementioned upper heat insulating plate 25, which is mounted on the top of frame 1, and a lower heat insulating plate 33 which is carried by brackets 34 that project from longitudinal supports 3. I further confine the heat to the upper flight of the conveyor by arranging side plates 35 of heat insulating material along each side of the device, as shown in Figs. 2 and 3.

The apparatus as a whole is enclosed in a sheet metal casing 36, a side 37 of which is hinged at 38 and provided with latches 39 so that the interior of the machine may be readily accessible for purposes of removing any of the heating elements for repair, or for removing a crumb tray 40 that normally rests on the lower heat insulating plate 33. Suitable apertures 41 are formed in the lower portion of the casing to permit free circulation of air therethrough to cool the lower flight of the conveyor. As shown in Figs. 1 and 3, the casing 36, above the main frame 1, extends only between uprights 2 so as to expose a portion of the upper flight of the conveyor and permit the operator to place the food products thereon. A shelf 42 projects from this end of the machine and serves as a convenient support for the uncooked food products. This shelf is preferably in the same plane with the upper flight of the conveyor so that the operator may easily slide the uncooked sandwiches or other food products directly onto the conveyor. At the opposite end of the casing there is arranged a receiving shelf 43 having a curved portion 44 which extends close to the bars 10 as they pass about the rear sprocket wheels 7. The cooked articles of food will thus be automatically removed from the conveyor and discharged onto shelf 43.

In use, power is applied, as previously set forth, to rotate drive sprocket 14 and the conveyor at a predetermined speed. Switch 31 is turned to energize the heating elements to the desired degree of heat. The operator then places the sandwiches or other articles of food on the exposed portion of the conveyor, whereupon they pass between the upper and lower heating elements and hence are cooked from both sides. The cooked food emerges automatically from the other end of the machine and is discharged onto shelf 43.

By using upper and lower heating elements I am enabled to obtain evenly cooked food and by use of the top, bottom and side insulating plates, I confine the heat to the food on the upper flight of the conveyor and not only greatly increase the efficiency of the machine, but also prevent radiation in the restaurant and against the operator. The machine is readily cleaned by opening side door 37 whereupon the crumb tray may be removed and access to the conveyor or heating elements is easily obtained.

What I claim is:

1. Electrical cooking apparatus of the character set forth comprising an endless conveyor arranged to traverse a predetermined path during its upper flight, a plurality of electric heating elements, said elements being secured above and below the central portion of the conveyor, heat insulating means disposed beneath the lower of said heating elements and along each side of said conveyor, a casing enclosing the heating elements and upper flight of the conveyor, the end portions of the upper flight of the conveyor being exposed to the air, an open loading platform arranged at the end of the conveyor in horizontal alignment with the upper flight, an open receiving platform arranged at the opposite end of the conveyor and having an inclined apron extending into close proximity to the path of the conveyor, and means for directing cooling air upon the conveyor during its lower flight.

2. Electrical cooking apparatus of the character set forth comprising an oblong angle iron framework, bearing blocks carried by said framework, shafts journalled in said bearing blocks and provided with sprockets, a conveyor engaged about said sprockets, a plurality of angle irons defining troughs carried by said framework and arranged beneath the upper flight of said conveyor, a rod in each trough, said rods serving as supports to cause the upper flight of said conveyor to travel a predetermined path, electric heating elements disposed in operative relation to the upper flight of said conveyor, a casing covering said heating elements, heat insulating material interposed between said heating elements and casing, the end portions of the upper flight of the conveyor being exposed to the air, and means for moving said conveyor.

In testimony whereof I affix my signature.

FRANK J. COOK.